United States Patent
Weddle

[19]

[11] Patent Number: 6,022,291
[45] Date of Patent: Feb. 8, 2000

[54] APPARATUS AND METHOD FOR CONTROLLING ROTATIONAL SPEED AND DIRECTION OF A DRIVE SHAFT OF A CROP SPRAYER

[75] Inventor: Kenneth E. Weddle, Trafalgar, Ind.

[73] Assignee: Equipment Technologies, LLC, Mooresville, Ind.

[21] Appl. No.: 09/036,248

[22] Filed: Mar. 6, 1998

[51] Int. Cl.[7] .......................... B60K 41/04; F16H 59/00
[52] U.S. Cl. .............................................. 477/113; 74/335
[58] Field of Search ..................................... 477/111, 112, 477/113; 192/51; 74/335, 336 R, 473 R, 471 XY

[56] References Cited

U.S. PATENT DOCUMENTS

| | | | |
|---|---|---|---|
| 2,771,168 | 11/1956 | Panish | 477/112 |
| 3,640,157 | 2/1972 | Schaefer | 477/126 |
| 3,795,157 | 3/1974 | Campbell et al. . | |
| 3,909,938 | 10/1975 | Pervier . | |
| 4,077,283 | 3/1978 | Hammond . | |
| 4,698,048 | 10/1987 | Rundle . | |
| 4,986,776 | 1/1991 | Hensel et al. . | |
| 5,062,516 | 11/1991 | Prince | 477/111 X |
| 5,184,523 | 2/1993 | Nyzedathy . | |
| 5,351,570 | 10/1994 | Mizunuma et al. . | |
| 5,406,860 | 4/1995 | Easton et al. . | |
| 5,566,070 | 10/1996 | Mack et al. . | |
| 5,658,088 | 8/1997 | Samuelsson | 477/111 X |

OTHER PUBLICATIONS

Marketing brochure entitled "New General–Purpose Sprayers: John Deere Self Propelled and Tractor–Mounted Hood Sprayers", from John Deer.

Marketing brochure entitled "Sneak Preview of the New 544 Rogator", from ag–chem Equipment Co., Inc.

Primary Examiner—Charles A Marmor
Assistant Examiner—Roger Pang
Attorney, Agent, or Firm—Maginot, Addison & Moore

[57] ABSTRACT

A speed control assembly includes a throttle which controls the rotational speed of a crankshaft of an engine and a hand lever which is operatively coupled to the throttle. The speed control assembly further includes a forward switch operatively coupled to a forward clutch. The forward switch causes the forward clutch to couple the crankshaft to a drive shaft so that the crankshaft rotates the drive shaft in a forward rotational direction when the forward switch is actuated by placing the hand lever in a forward position. The first switch also causes the forward clutch to decouple the crankshaft from the drive shaft so that the crankshaft does not rotate the drive shaft in the forward rotational direction when the forward switch is deactuated. The speed control assembly yet further includes a reverse switch operatively coupled to a reverse clutch. The reverse switch causes the reverse clutch to couple the crankshaft to the drive shaft so that the crankshaft rotates the drive shaft in a reverse rotational direction when the reverse switch is actuated by placing the hand lever in a reverse position. The reverse switch also causes the reverse clutch to decouple the crankshaft from the drive shaft so that the crankshaft does not rotate the drive shaft in the reverse rotational direction when the reverse switch is deactuated.

21 Claims, 5 Drawing Sheets

APPARATUS AND METHOD FOR CONTROLLING ROTATIONAL SPEED AND DIRECTION OF A DRIVE SHAFT OF A CROP SPRAYER

TECHNICAL FIELD OF THE INVENTION

The present invention relates generally to a crop sprayer, and more particularly to an apparatus and method for controlling rotational speed and direction of a drive shaft of a crop sprayer.

BACKGROUND OF THE INVENTION

A crop sprayer is used to distribute chemicals, such as herbicides, pesticides, and fertilizer, over crops in a field during a spraying operation. In order to maneuver the crop sprayer around the field during the spraying operation, an operator of the crop sprayer operates various controls which affect speed and direction of the crop sprayer. Note that speed and direction of the crop sprayer is directly related to the rotational speed and direction of a drive shaft of the crop sprayer.

One of the above controls allows the operator to selectively couple and decouple an engine crankshaft of the crop sprayer from the drive shaft. Another of the above controls allows the operator to selectively change the gear ratio between the engine crankshaft and the drive shaft. Still another of the above controls allows the operator to selectively increase and decrease rotational speed of the engine crankshaft.

To control the movement of a conventional tractor, a foot activated clutch is used to selectively couple and decouple the engine crankshaft from the drive shaft, a hand actuated gear selector is used to selectively change the gear ratio between the engine crankshaft and the drive shaft, and a foot actuated throttle is used to control the rotational speed of the engine crankshaft.

In addition to the controls which the operator must operate in order to maneuver the crop sprayer around the field, the crop sprayer also includes other controls which operate the chemical spraying features of the crop sprayer. In particular, the crop sprayer has a boom arm control which raises, lowers, extends, and retracts a boom arm. The crop sprayer further has a spray control which adjusts the flow rate of chemicals from a storage tank through a number of nozzles mounted on the boom arm.

As can be seen from the above, there exists a significant number of separate controls which an operator must manipulate to control the movement and chemical spraying features of the crop sprayer. Manipulation of this significant number of controls may create a burden on the operator.

One manner of reducing the above burden on the operator of the crop sprayer is to utilize a hydrostatic drive system in the crop sprayer. The hydrostatic drive system includes a hand lever which when manipulated causes a hydraulic fluid to be advanced within the system so as to cause rotation of the wheels of the crop sprayer at a desired rotational speed and direction. Thus, use of the hydrostatic drive system eliminates the need for an operator to (i) use his foot to activate a clutch to selectively couple and decouple the engine crankshaft from the drive shaft, and (ii) to use his foot to selectively actuate the throttle to control the speed of the engine crankshaft. A separate control may be used to selectively change the gear ratio between the engine crankshaft and the drive shaft. Consequently, use of a hydrostatic drive system enables an operator to maneuver the crop sprayer around the field with a fewer number of separate controls thereby reducing the burden on the operator of the crop sprayer.

However, a drawback to using a hydrostatic drive system is that the hydrostatic drive system is typically heavy, complex, and expensive. The weight of the hydrostatic drive system inhibits mobility of the crop sprayer, especially in soft terrain. Wider tires can be used to distribute the weight of the crop sprayer over a larger area so as to increase mobility. However, the use of wider tires would require an additional distance to be provided between rows of the crop in order to enable clearance for the wider tires. Alternatively, if the additional distance between the rows of the crop is not provided, the wider tires would tend to tread on the crops thereby damaging a portion of the crop during a spraying operation. In either case, crop production is reduced by using wider tires.

What is needed therefore is an apparatus and method for reducing the number of separate controls required to control the movement and operate the spraying features of a crop sprayer without significantly increasing the weight of the crop sprayer.

SUMMARY OF THE INVENTION

In accordance with a first embodiment of the present invention, there is provided speed control assembly. The speed control assembly includes a throttle which controls rotational speed of a crankshaft of an engine and a hand lever which is operatively coupled to the throttle. The speed control assembly further includes a forward switch operatively coupled to a forward clutch. The forward switch causes the forward clutch to couple the crankshaft to a drive shaft so that the crankshaft rotates the drive shaft in a forward rotational direction when the forward switch is actuated. The forward switch also causes the forward clutch to decouple the crankshaft from the drive shaft so that the crankshaft does not rotate the drive shaft in the forward rotational direction when the forward switch is deactuated. The speed control assembly yet further includes a reverse switch operatively coupled to a reverse clutch. The reverse switch causes the reverse clutch to couple the crankshaft to the drive shaft so that the crankshaft rotates the drive shaft in a reverse rotational direction when the reverse switch is actuated. The reverse switch also causes the reverse clutch to decouple the crankshaft from the drive shaft so that the crankshaft does not rotate the drive shaft in the reverse rotational direction when the reverse switch is deactuated. The speed control apparatus still further includes a speed control console having a lever aperture defined therein through which the hand lever extends. The lever aperture includes a forward segment, a reverse segment, and an intermediate segment. The forward segment and the intermediate segment define a forward transition corner. The reverse segment and the intermediate segment define a reverse transition corner. The forward segment defines a terminal forward end. The reverse segment defines a terminal reverse end. The forward switch is actuated when the hand lever is positioned within the forward transition corner. The reverse switch is actuated when the hand lever is positioned within the reverse transition corner. Movement of the hand lever from the forward transition corner to the terminal forward end causes the throttle to increase speed of the crankshaft. Movement of the hand lever from the reverse transition corner to the terminal reverse end causes the throttle to increase speed of the crankshaft.

In accordance with a second embodiment of the present invention, there is provided a speed control assembly. The speed control assembly includes a throttle which controls rotational speed of a crankshaft of an engine. The speed control assembly further includes a carriage which is operatively coupled to the throttle. The crankshaft rotates at a low speed when the carriage is positioned at a low speed position. The crankshaft rotates at a high speed when the carriage is positioned at a high speed position. The speed control assembly further includes a forward switch supported by the carriage. The forward switch is operatively coupled to a forward clutch. The speed control assembly yet further includes a reverse switch supported by the carriage. The reverse switch is operatively coupled to a reverse clutch. The speed control assembly still further includes a hand lever which is supported by the carriage. The hand lever is movable relative to the carriage so as to be positionable in any one of the following positions: a forward position, a neutral position, and a reverse position. The forward switch is actuated and the reverse switch is deactuated when hand lever is positioned in the forward position. The forward switch is deactuated and the reverse switch is actuated when hand lever is positioned in the reverse position Both the forward switch and the reverse switch are deactuated when hand lever is positioned in the neutral position. The forward switch causes the forward clutch to couple the crankshaft to a drive shaft so that the crankshaft rotates the drive shaft in a forward rotational direction when the forward switch is actuated. The forward switch also causes the forward clutch to decouple the crankshaft from the drive shaft so that the crankshaft does not rotate the drive shaft in the forward rotational direction when the forward switch is deactuated. The reverse switch causes the reverse clutch to couple the crankshaft to the drive shaft so that the crankshaft rotates the drive shaft in a reverse rotational direction when the reverse switch is actuated. The reverse switch causes the reverse clutch to decouple the crankshaft from the drive shaft so that the crankshaft does not rotate the drive shaft in the reverse rotational direction when the reverse switch is deactuated.

In accordance with a third embodiment of the present invention, there is provided a method of controlling rotational speed and direction of a drive shaft with a speed control assembly. The speed control assembly has a throttle which controls rotational speed of a crankshaft of an engine and a carriage which is operatively coupled to the throttle. The crankshaft rotates at a low speed when the carriage is positioned at a low speed position. The crankshaft rotates at a high speed when the carriage is positioned at a high speed position. The speed control assembly further includes a forward switch operatively coupled to a forward clutch. The forward switch causes the forward clutch to couple the crankshaft to the drive shaft so that the crankshaft rotates the drive shaft in a forward rotational direction when the forward switch is actuated. The forward switch also causes the forward clutch to decouple the crankshaft from the drive shaft so that the crankshaft does not rotate the drive shaft in the forward rotational direction when the forward switch is deactuated. The speed control assembly still further includes a reverse switch operatively coupled to a reverse clutch. The reverse switch causes the reverse clutch to couple the crankshaft to the drive shaft so that the crankshaft rotates the drive shaft in a reverse rotational direction when the reverse switch is actuated. The reverse switch also causes the reverse clutch to decouple the crankshaft from the drive shaft so that the crankshaft does not rotate the drive shaft in the reverse rotational direction when the reverse switch is deactuated. The speed control assembly yet further includes a hand lever which is supported by the carriage. The hand lever is movable relative to the carriage so as to be positionable in any one of the following positions: a forward position, a neutral position, and a reverse position. The forward switch is actuated and the reverse switch is deactuated when the hand lever is positioned in the forward position. The forward switch is deactuated and the reverse switch is actuated when the hand lever is positioned in the reverse position. Both the forward switch and the reverse switch are deactuated when hand lever is positioned in the neutral position. The method includes the step of moving the carriage from the low speed position to the high speed position when the hand lever is positioned in the forward position whereby speed of the drive shaft in the forward rotational direction is increased. The method further includes the step of moving the carriage from the low speed position to the high speed position when the hand lever is positioned in the reverse position whereby speed of the drive shaft in the reverse rotational direction is increased.

BEST MODE FOR CARRYING OUT THE INVENTION

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Figure 1:
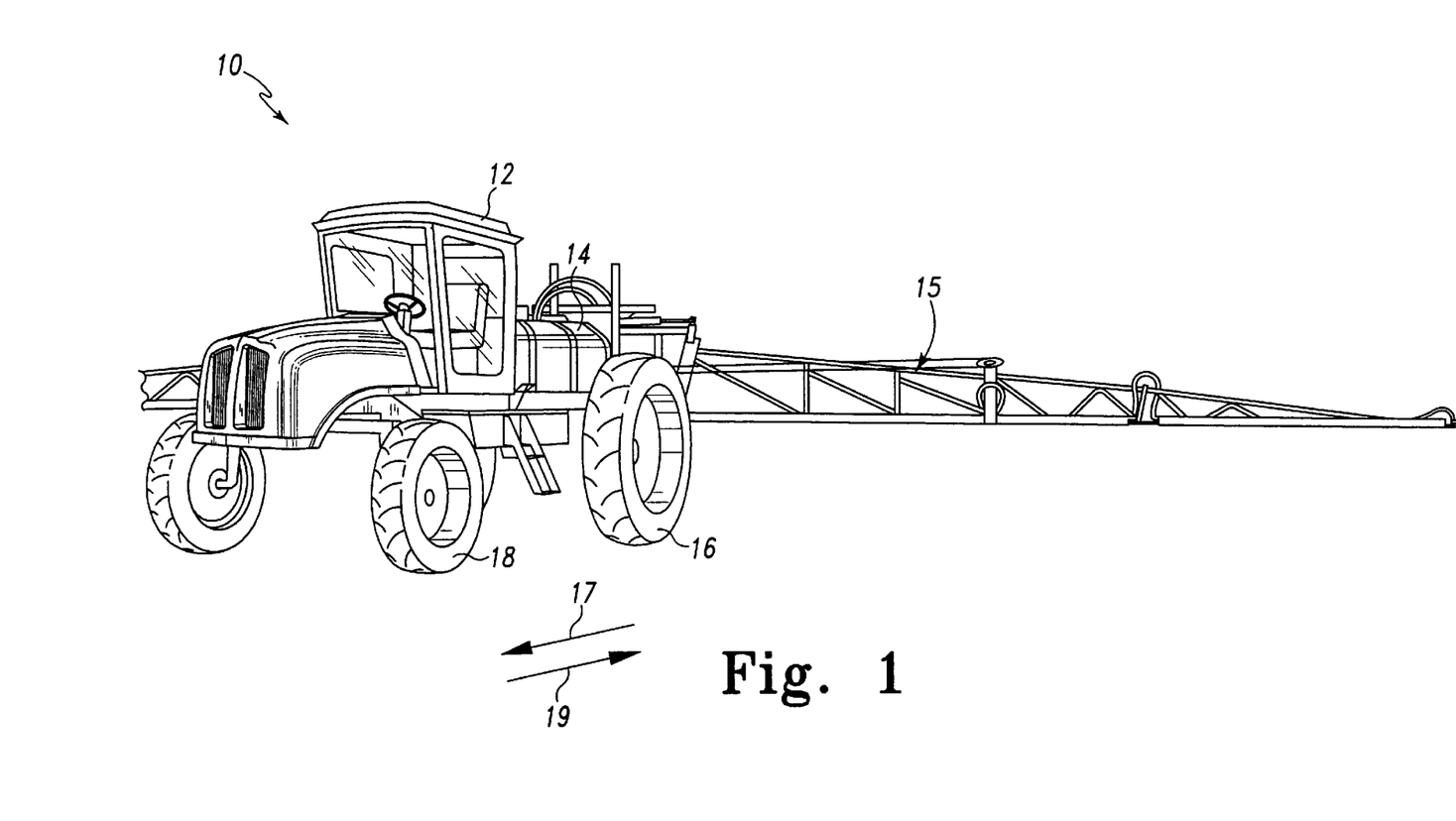
FIG. 1 is a perspective view of a crop sprayer which incorporates the features of the present invention therein.

Referring now to FIG. 1, there is shown a crop sprayer 10. The crop sprayer 10 includes a cab 12 which houses an operator and a number of controls. The crop sprayer 10 further includes a chemical tank 14 which stores chemicals, such as herbicides, pesticides, and fertilizers. The crop sprayer 10 further includes a boom arm 15 which is operable to distribute the chemicals over a wide swath in a field. In particular, the chemicals are distributed by nozzles (not shown) spaced along the boom arm 15 through which the chemicals are sprayed as the crop sprayer 10 is propelled in the general direction of arrows 17 and 19. The crop sprayer 10 further includes a pair of rear wheels 16 and a pair of front wheels 18. The rear wheels 16 are driven by a drive train assembly 20 (shown in FIG. 2) so as to propel the crop sprayer 10 in the general direction of arrows 17 and 19. The front wheels 16 are operable to steer the crop sprayer 10.

Figure 2:
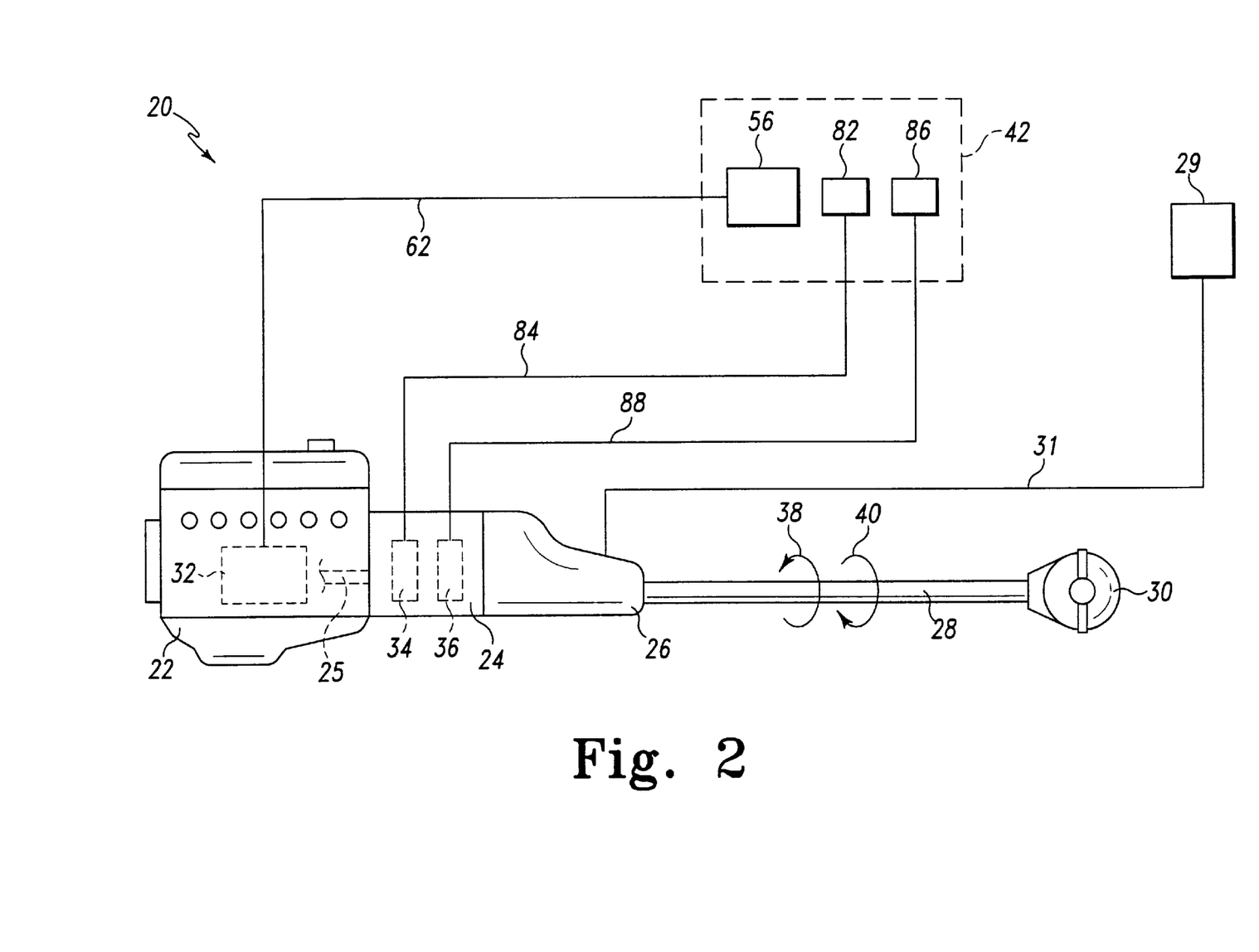
FIG. 2 is a schematic view of a drivetrain and control console of the crop sprayer of FIG. 1.

Referring now to FIG. 2, there is shown the drive train assembly 20 of the crop sprayer 10. The drive train assembly 20 includes an engine 22, a clutch assembly 24, a transmission 26, a drive shaft 28, and a rear differential and rear axle.

The engine 22 is a diesel engine which is commercially available from Cummins Engine Co. Inc., of Columbus, Indiana as model 4BT. Diesel engines have several advantages including high torque output, reliability, and low fuel cost. The engine 22 generates mechanical energy which is transferred to the clutch assembly 24 by a crankshaft 25 of the engine 22.

The engine 22 includes a throttle 32. The throttle 32 is operable to control rotational speed of the crankshaft 25 of the engine 22. In particular, the throttle 32 controls the amount of air that is advanced into a combustion chamber (not shown) of the engine 22. As the amount of air advanced into the combustion chamber is increased, the flow of fuel injected into the combustion chamber is similarly increased. By increasing the amount of fuel and air combusted in the combustion chamber of the engine 22, the rotational speed of the crankshaft 25 of the engine 22 is increased. A linkage 62 is used to position the throttle 32 during operation of the engine 22 so as to control the rotational speed of the crankshaft 25.

The clutch assembly 24, the transmission 26, the drive shaft 28 and the rear differential and rear axle 30 are commercially available as a matched set from International Transmissions LTD of Wrexham, United Kingdom as transmission and axle package 475/45200. The clutch assembly 24 is positioned between the engine 22 and the drive shaft 28. The clutch assembly 24 includes a torque converter which has a forward clutch 34 and a reverse clutch 36.

The forward clutch 34 is operable to selectively couple and decouple the crankshaft 25 of the engine 22 to the drive shaft 28. In particular, when the forward clutch 34 couples the crankshaft 25 to the drive shaft 28, the drive shaft 28 is caused to rotate in a forward rotational direction, as indicated by arrow 38. When the drive shaft 28 rotates in the forward rotational direction, the rear wheels 16 are rotated so as to advance the crop sprayer 10 in the forward direction, as shown by arrow 17 in FIG. 1. Whereas, when the forward clutch 34 decouples the crankshaft 25 from the drive shaft 28, the drive shaft 28 is not caused to rotate in the forward rotational direction as indicated by arrow 38. As a result, when the forward clutch 34 decouples the crankshaft 25 from the drive shaft 28, the engine 22 does not cause the rear wheels 16 to rotate so as to advance the crop sprayer 10 in the forward direction.

The forward clutch 34 is actuated so as to couple the crankshaft 25 to the drive shaft 28 in response to an electric signal being received via a signal line 84. In particular, when an "on" signal is received by the forward clutch 34 via the signal line 84, the forward clutch 34 couples the crankshaft 25 to the drive shaft 28 so as to rotate the drive shaft 28 in the forward rotational direction. When an "off" signal is received by the forward clutch 34 via the signal line 84, the forward clutch decouples the crankshaft 25 from the drive shaft 28.

Similarly, the reverse clutch 36 is operable to selectively couple and decouple the crankshaft 25 of the engine 22 to the drive shaft 28. In particular, when the reverse clutch 36 couples the crankshaft 25 to the drive shaft 28, the drive shaft 28 is caused to rotate in a reverse rotational direction, as indicated by arrow 40. When the drive shaft 28 rotates in the reverse rotational direction, the rear wheels 16 are rotated so as to advance the crop sprayer 10 in the reverse direction, as shown by arrow 19 in FIG. 1. Whereas, when the reverse clutch 36 decouples the crankshaft 25 from the drive shaft 28, the drive shaft 28 is not caused to rotate in the reverse rotational direction as indicated by arrow 40. As a result, when the reverse clutch 36 decouples the crankshaft 25 from the drive shaft 28, the engine 22 does not cause the rear wheels 16 to rotate so as to advance the crop sprayer 10 in the reverse direction.

The reverse clutch 36 is actuated so as to couple the crankshaft 25 to the drive shaft 28 in response to an electric signal being received via a signal line 88. In particular, when an "on" signal is received by the reverse clutch 36 via the signal line 88, the reverse clutch 36 couples the crankshaft 25 to the drive shaft 28 so as to rotate the drive shaft 28 in the reverse rotational direction. When an "off" signal is received by the reverse clutch 36 via the signal line 88, the reverse clutch 36 decouples the crankshaft 25 from the drive shaft 28.

The transmission 26 is interposed between the clutch assembly 24 and the drive shaft 28. The transmission 26 is a four speed transmission which is operative to provide four separate gear ratios between the crankshaft 25 and the drive shaft 28. The transmission 26 allows the operator to selectively change the gear ratio between the clutch assembly 24 and the drive shaft 28. In particular, a gear selector assembly 29, located in the cab 12, is manipulated so as to cause the transmission 26 to change the gear ratio between the clutch assembly 24 and the drive shaft 28 via a mechanical linkage 31. The change of gear ratios allows the engine 22 to provide torque to the rear wheels 16 for a variety of operating conditions. In particular, a gear ratio may be selected that provides high torque at low crankshaft speeds whereas a different gear ratio may be selected that provides low torque at high crankshaft speeds.

The drive shaft 28 is operatively coupled to the rear differential and rear axle. The rear differential and rear axle 30 splits the power from the drive shaft 28 between each of the rear wheels 16 (shown in FIG. 1) in order to propel the crop sprayer 10 in the forward direction and the reverse direction.

Figure 3:
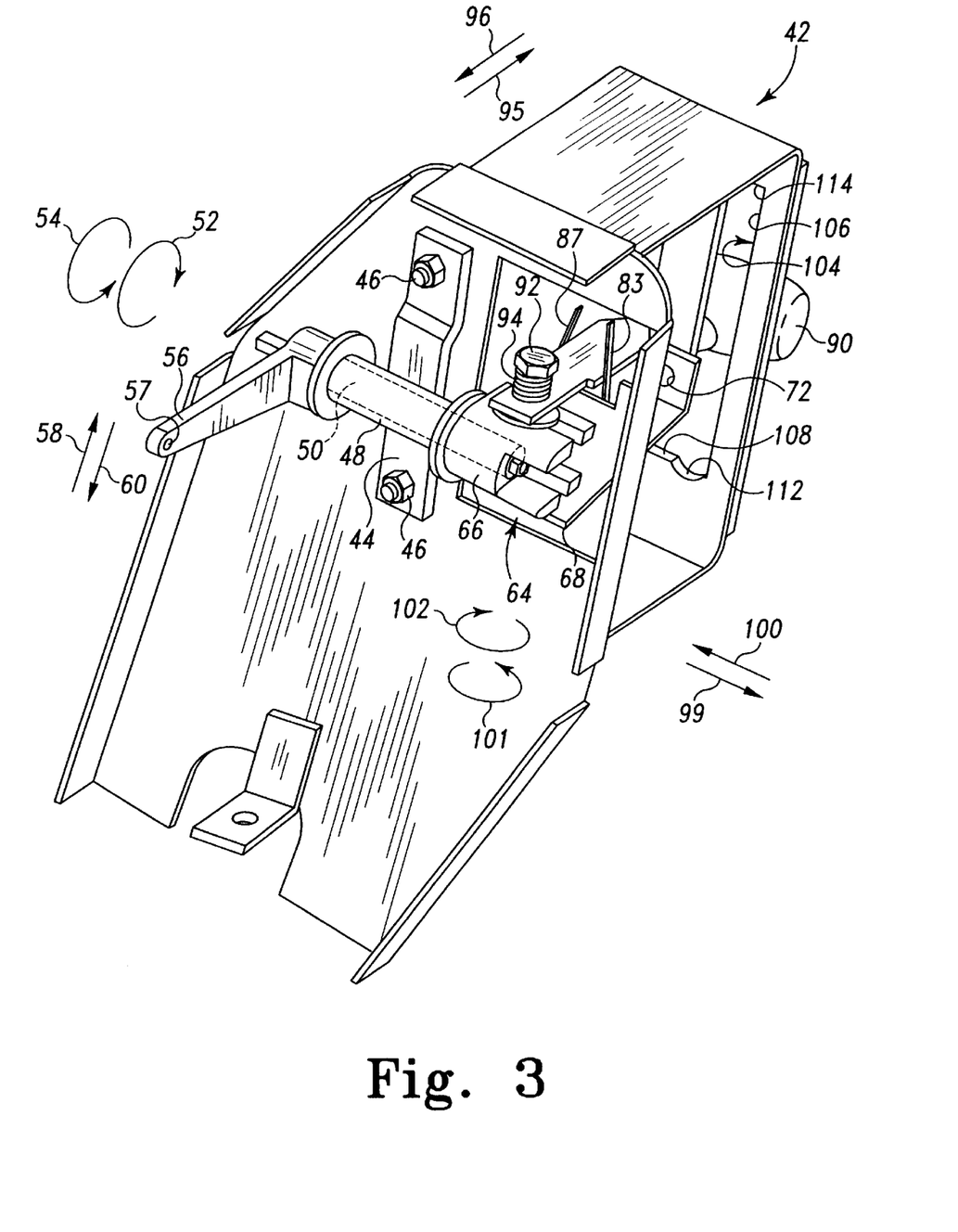
FIG. 3 is a bottom perspective view of the control console of FIG. 2.

Referring now to FIG. 3, there is shown the control console 42 which is mounted in the cab 12 (shown in FIG. 1). A bracket 44 is secured to the underside of the control console 42 by a pair of bolts 46. A tube 48 is secured to the bracket 44. An axle 50 is positioned within the tube 48 such that the axle 50 can rotate in the general direction of arrows 52 and 54.

Figure 5:
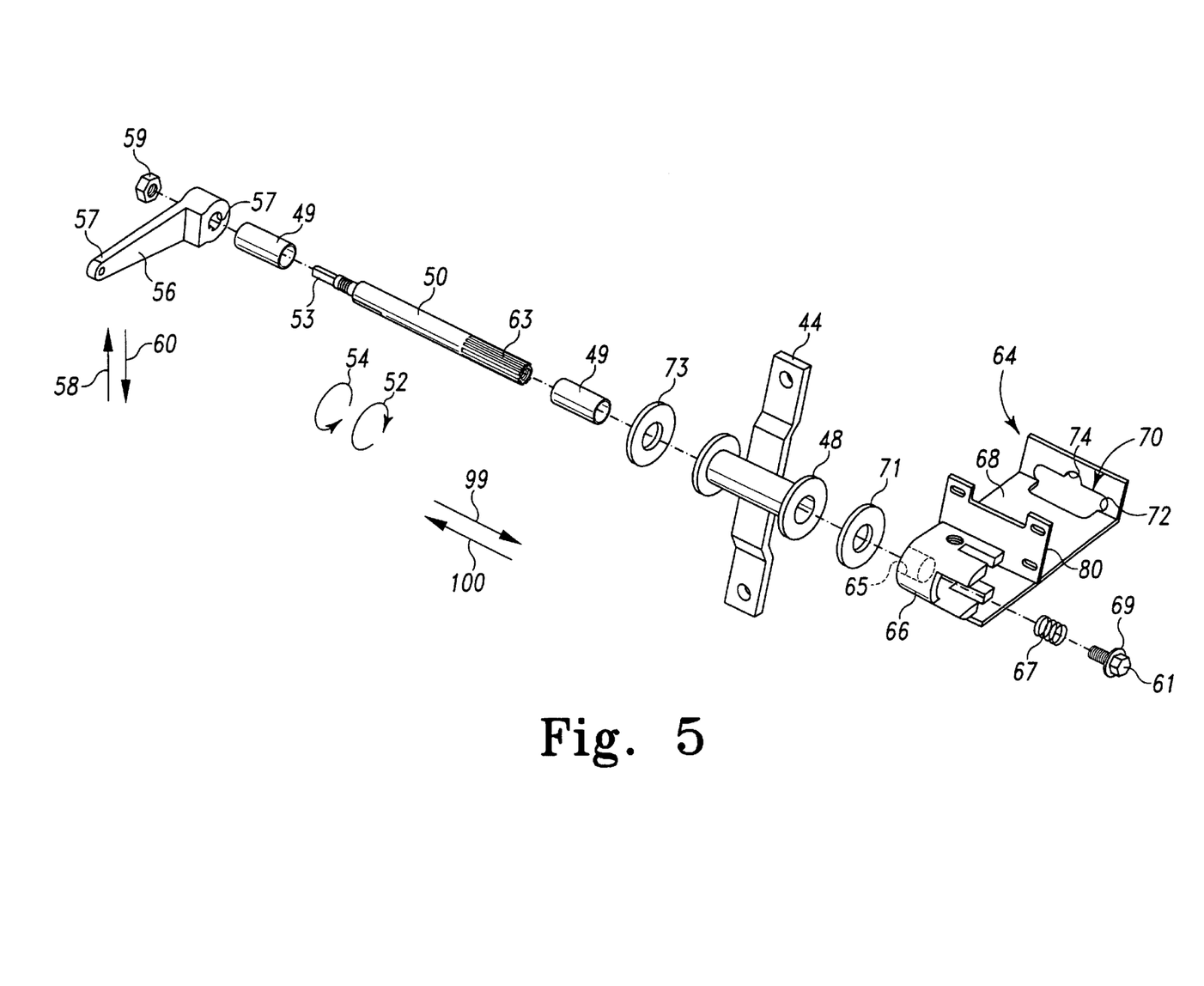
FIG. 5 is an expanded view of the carriage frame and throttle actuator.

Referring now to FIG. 5, a pair of sleeves 49 are interposed between the axle 50 and the tube 48 to facilitate rotation of the axle 50 relative to the tube 48 in the general direction of arrows 52 and 54. The axle 50 is secured to a throttle actuator 56. In particular, a threaded end 53 of the axle 50 is received through an aperture 55 of the throttle actuator 56. The threaded end 53 and the aperture 55 have a matched shape which prevents the axle 50 from rotating relative to the throttle actuator 56 in the general direction of arrows 52 and 54. A nut 59 is screwed on the threaded end 53 so as to prevent the throttle actuator 56 from moving relative to the axle 50 in the general directions of arrows 99 and 100. When the axle 50 is rotated in the general direction of arrow 54, an end 57 of the throttle actuator 56 is moved in the general direction of arrow 60. In contrast, when the axle 50 is rotated in the general direction of arrow 52, the end 57 of the throttle actuator 56 is moved in the general direction of arrow 58.

The throttle linkage 62 (shown in FIG. 2) operatively connects the end 57 of the throttle actuator 56 to the throttle 32 (shown in FIG. 2) such that movement of the throttle actuator 56 positions the throttle 32. As the throttle actuator 56 is moved in the general direction of arrow 58, the throttle 32 is positioned to admit less fuel and air to the combustion chamber of the engine 22, thus decreasing the rotational speed of the crankshaft 25. As the throttle actuator 56 is moved in the general direction of arrow 60, the throttle 32 is positioned to admit more fuel and air to the combustion chamber of the engine 22, thus increasing the rotational speed of the crankshaft 25.

It should be appreciated that rotation of the shaft 50 in the general direction of arrow 54 moves the end 57 of the throttle actuator 56 in the general direction of arrow 60 which increases the rotational speed of the crankshaft 25. It further should further be appreciated that rotation of the shaft 50 in the general direction of arrow 52 moves the end 57 of the throttle actuator 56 in the general direction of arrow 58 which decreases the rotational speed of the crankshaft 25.

The axle 50 is also secured to a carriage assembly 64. In particular, the carriage assembly 64 includes a carriage support 66 having a grooved aperture 65 defined therein. A matching end 63 of the axle 50 is received through the grooved aperture 65 of the carriage support 66 such that the carriage support 66 cannot rotate relative to the axle 50 in the general direction of arrows 52 and 54. Furthermore, a bolt 61 is received through a washer 69 and screwed into a set of internal threads (not shown) defined in the end 63.

A spring 67 is interposed between washer 69 and the carriage support 66. The spring 67 applies a bias force against the axle 50 in the general direction of arrow 99. As the bolt 61 is threadingly advanced in the general direction of arrow 100, the spring 67 is compressed between the washer 69 and the carriage support 66 such that the spring 67 applies a bias force against the washer 69 which urges the bolt 61 in the general direction of arrow 99. The bolt 61 then urges the axle 50 in the general direction of arrow 99. To increase the bias force of the spring 67 on the axle 50, the bolt 61 is threadingly advanced in the general direction of arrow 100 relative to the axle 50 whereas to decrease the bias force of the spring 67 on the axle 50, the bolt 61 is threadingly advanced in the general direction of arrow 99 relative to the axle 50.

A first nylon washer 71 is interposed between the carriage support 66 and the tube 48. The first nylon washer 71 provides a first frictional force between the carriage support 66 and the tube 48 which opposes rotation of the axle 50 in the general directions of arrows 52 and 54. A second nylon washer 73 is interposed between the throttle actuator 56 and the tube 48. The second nylon washer 73 provides a second frictional force between the throttle actuator 56 and the tube 48 which opposes rotation of the axle 50 in the general directions of arrows 52 and 54.

The first frictional force and the second frictional force collectively inhibit rotation of the axle 50 relative to the tube 48 in the general direction of arrows 52 and 54.

The magnitude of the first frictional force and the second frictional force can be adjusted by threadingly advancing the bolt 61 in the general direction of either arrow 99 or 100. In particular, threadingly advancing the bolt 61 in the general direction of arrow 100 increases the bias force of the spring 67 on the carriage support 66 in the thereby causing the carriage support to urge the first nylon washer 71 toward the tube 48 so as to increase the first frictional force. Similarly, threadingly advancing the bolt 61 in the general direction of arrow 100 increases the bias force of the spring 67 on the axle 50 thereby causing the axle 50 and throttle actuator 56 to urge the second nylon washer 73 toward the tube 48 so as to increase the second frictional force. Adjusting first frictional force and the second frictional force is a feature of the present invention which allows an operator to adjust the force that opposes movement of the axle 50.

It should be appreciated that as the axle 50 is rotated relative to the tube 48 in the general direction of arrow 54, the carriage support 66 is also rotated relative to the tube 48 in the general direction of arrow 54. Similarly, as the axle 50 is rotated relative to the tube 48 in the general direction of arrow 52, the carriage support 66 is also rotated relative to the tube 48 in the general direction of arrow 52.

The carriage assembly 64 further includes a carriage frame 68 that is secured to the carriage support 66. In particular, the carriage frame 68 is welded to the carriage support 66 such that rotation of the carriage frame 68 in the general direction of arrow 52 rotates the carriage support 66 in the general direction of arrow 52. In contrast, rotation of the carriage support 66 in the general direction of arrow 54 rotates the carriage frame 68 in the general direction of arrow 54.

Figure 4:
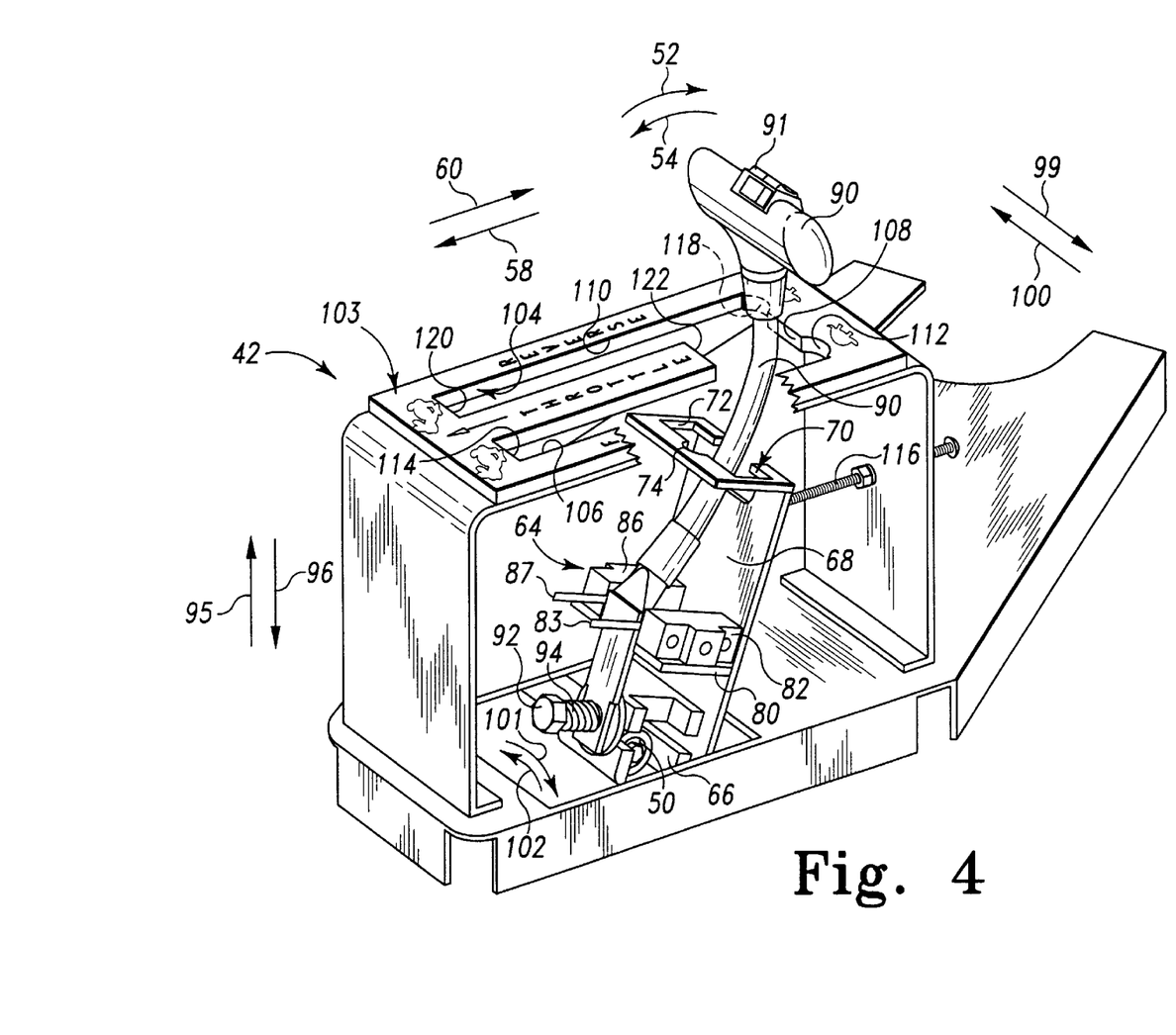
FIG. 4 is a top perspective view of the control console of FIG. 2 (note that an upper portion of the control console has been cut away for clarity of description).

Referring now to FIG. 4, the upper portion of the carriage frame 68 has a selector gate 70 defined therein. The selector gate 70 includes a slot portion 72 and a detent notch 74. The slot portion runs in the general direction of arrows 99 and 100. The detent notch 74 extends a distance from the center of the slot portion 72 in the general direction of arrow 58.

The carriage assembly 64 further includes a carriage platform 80 secured to the carriage frame 68 approximately half way between the carriage support 66 and the selector gate 70. A forward switch 82 is mounted on the left side of the carriage platform 80. The forward switch 82 is commercially available from OMRON Electronics, Inc. of Schaumburg, Illinois as model A-20GV-B7-K. The forward switch 82 is operatively coupled to the forward clutch 34, as shown in FIG. 2. In particular, the signal line 84 connects the forward switch 82 to the forward clutch 34. Furthermore, when the forward switch 82 is actuated, an "on" signal is sent from the forward switch 82 via the signal line 84 so as to actuate the forward clutch 34. It should be appreciated that when the forward clutch 34 is actuated, the forward clutch 34 couples the crankshaft 25 to the drive shaft 28 such that the engine 22 propels the crop sprayer 10 in the forward direction as indicated by arrow 17 in FIG. 1. When the forward switch 82 is deactuated, an "off" signal is sent via the signal line 84 so as to deactuate the forward clutch 34 which decouples the crankshaft 25 from the drive shaft 28 such that the engine 22 does not propel the crop sprayer 10 in the forward direction.

Similarly, a reverse switch 86 is mounted on the right side of the carriage platform 80. The reverse switch 86 is commercially available from OMRON Electronics, Inc. of Schaumburg, Illinois as model A-20GV-B7-K. The reverse switch 86 is operatively coupled to the reverse clutch 36, as shown in FIG. 2. In particular, the signal line 88 connects the reverse switch 86 to the reverse clutch 36. Furthermore, when the reverse switch 86 is actuated, an "on" signal is sent from the reverse switch 86 via the signal line 88 so as to actuate the reverse clutch 36. It should be appreciated that when the reverse clutch 36 is actuated, the reverse clutch 36 couples the crankshaft 25 to the drive shaft 28 such that the engine 22 propels the crop sprayer 10 in the reverse direction as indicated by arrow 19 in FIG. 1. When the reverse switch 86 is deactuated, an "off" signal is sent via the signal line 88 so as to deactuate the reverse clutch 36 which decouples the crankshaft 25 from the drive shaft 28 such that the engine 22 does not propel the crop sprayer 10 in the reverse direction.

A hand lever 90 is provided that includes a number of controls 91 which are operative to cause manipulation of the boom arm 15 and to control the chemical flow rate through the nozzles of the crop sprayer 10. The hand lever 90 is attached to the carriage support 66 by a bolt 92. The bolt 92 prevents the hand lever 90 from moving up or down in the general direction of arrows 95 and 96. A spring 94 is interposed between the bolt 92 and the carriage support 66. The spring 94 allows the hand lever 90 to pivot relative to the carriage assembly 64 about the bolt 92 in the general direction of arrows 101 and 102. Moreover, the hand lever 90 is free to pivot about the bolt 92 relative to the carriage support 66 in the general direction of arrows 52 and 54. It should be appreciated that the spring 94 applies a bias force against the hand lever 90 which acts to pivot the hand lever 90 to bias the lower portion of the hand lever 90 against the carriage support 66 in the general direction of arrow 60. This results in an upper portion of the hand lever 90 being spring biased into the detent notch 74.

A central portion of the hand lever 90 is received through the selector gate 70 defined in the carriage frame 68. It should be appreciated that because the hand lever 90 is free to pivot about the bolt 92 in the general direction of arrows 101 and 102, the hand lever 90 is free to move in the direction of arrows 99 and 100 in the selector gate 70.

To position the hand lever 90 in a forward position, the hand lever 90 is moved to the furthest extent of the slot 72 in the general direction of arrow 99. When the hand lever 90 is located in the forward position, the hand lever 90 urges a spring biased cantilevered member 83 of the forward switch 82 in the general direction of arrow 99 which actuates the forward switch 82. When the hand lever 90 is moved out of the forward position in the general direction of arrow 100, the spring biased cantilevered member 83 returns to its original position (shown in FIG. 4) which deactuates the forward switch 82.

To position the hand lever 90 in a reverse position, the hand lever 90 is moved to the furthest extent of the slot 72 in the general direction of arrow 100. When the hand lever 90 is located in the reverse position, the hand lever 90 urges a spring biased cantilevered member 87 of the reverse switch 86 in the general direction of arrow 100 which actuates the reverse switch 86. When the hand lever 90 is moved out of the reverse position in the general direction of arrow 99, the spring biased cantilevered member 87 returns to its original position (shown in FIG. 4) which deactuates the reverse switch 88.

It should be appreciated that positioning the hand lever 90 in the forward position actuates the forward switch 82 which actuates the forward clutch 34 so as to couple the crankshaft 25 to the drive shaft 28 thereby allowing the engine 22 to propel the crop sprayer 10 in the forward direction. It should further be appreciated that positioning the hand lever 90 in the reverse position actuates the reverse switch 86 which actuates the reverse clutch 36 so as to couple the crankshaft 25 to the drive shaft 28 thereby allowing the engine 22 to propel the crop sprayer 10 in the reverse direction.

To position the hand lever 90 in a neutral position, the hand lever 90 is moved so as to be positioned within the detent notch 74 of the selector gate 70. In the neutral position, both the forward switch 82 and the reverse switch 86 are deactuated. Thus, neither the forward clutch 34 nor the reverse clutch 36 are actuated. In the neutral position, rotation of the crankshaft 25 of the engine 22 does not cause the crop sprayer 10 to advance in the forward direction or the reverse direction. In addition, the bias of the spring 94 urges the hand lever 90 in the general direction of arrow 58 which retains the hand lever 90 in the detent notch 74 of the selector gate 70. The hand lever 90 cannot be moved in the general direction of arrow 99 or 100 unless the hand lever is first moved in the general direction of arrow 60 against the bias of the spring 94.

Thus, it should be appreciated that the hand lever 90 cannot be moved into the slot 72 until a sufficient force is applied to the hand lever 90 in the general direction of arrow 60 to overcome the bias of the spring 94. The bias force of the spring 94 combined with the detent notch 74 in the selector gate 70 are advantageously configured as a safety feature of the present invention. This safety feature prevents the forward clutch 34 or the reverse clutch 36 from coupling the crankshaft 25 to the drive shaft 28 unless a significant force is applied to the hand lever 90 in the general direction of arrow 60 to overcome the bias of the spring 94.

The hand lever 90 is also operable to actuate the throttle 32 of the engine 22. In particular, when the hand lever 90 is moved in the general direction of arrow 54, the hand lever 90 rotates the carriage frame 68 of the carriage assembly 64 in the general direction of arrow 58. As the carriage frame 68 is rotated in the general direction of arrow 54, the carriage support 66 and the axle 50 are also rotated in the general direction of arrow 54. Rotation of the axle in the general direction of arrow 54 causes the end 57 of the throttle actuator 56 to move in the general direction of arrow 60 which increases the rotational speed of the crankshaft 25 as described above.

Similarly, when the hand lever 90 is moved in the general direction of arrow 52, the hand lever 90 rotates the carriage frame 68 of the carriage assembly 64 in the general direction of arrow 52. As the carriage frame 68 is rotated in the general direction of arrow 52, the carriage support 66 and the axle 50 are rotated in the general direction of arrow 52. Rotation of the axle in the general direction of arrow 52 causes the end 57 of the throttle actuator 56 to move in the general direction of arrow 58 which decreases the rotational speed of the crankshaft 25 as described above.

The travel of the carriage frame 68 is limited in the general direction of arrow 52 by an adjustable bolt 116 secured to the control console 42. In particular, as the hand lever 90 rotates the carriage frame 68 in the general direction of arrow 52, the carriage frame 68 comes into contact with the adjustable bolt 116. Positioning the hand lever 90 in a position where the carriage frame 68 contacts the adjustable bolt 116 places the carriage frame 68 in a low speed position which causes the crankshaft 25 rotate at an idle or low speed. It should be appreciated that the low speed can be increased by advancing the adjustable bolt 116 in the general direction of arrow 58 whereas the low speed can be decreased by advancing the adjustable bolt 116 in the general direction of arrow 60.

An upper portion of the hand lever 90 is received through a U-shaped console aperture 104 defined in an upper plate 103 of the control console 42. The console aperture 104 includes a forward segment 106, an intermediate segment 108, and a reverse segment 110. The intersection of the forward segment 106 and the intermediate segment 108 defines a forward transition corner 112. It should be appreciated that to position the hand lever 90 in the intermediate segment 108, the hand lever 90 must be moved to a position that places the carriage frame 68 in the low speed position. It should further be appreciated that to position the hand lever 90 in the forward transition corner 112, the hand lever 90 is moved to the forward position which actuates the forward switch 82 so as to actuate the forward clutch 34.

From the forward transition corner 112, the hand lever 90 may be moved in the general direction of arrow 54 so as to increase the rotational speed of the crankshaft 25 of the engine 22. The travel of the hand lever 90 is restricted from moving in the general direction of arrow 54 by contact with a forward terminal end 114 of the forward segment 106. When the hand lever 90 contacts the forward terminal end 114, the carriage frame 68 is positioned in a high speed position. Placing the carriage frame 68 in the high speed position causes the engine 22 to rotate the crankshaft 25 at a high speed.

It should be appreciated that when the hand lever 90 is positioned in the forward segment 106, the forward clutch 34 is actuated which enables the engine 22 to propel the crop sprayer 10 in the forward direction. As the hand lever 90 is moved from the low speed position to the high speed position in the general direction of arrow 54, the velocity of the crop sprayer in the forward direction is increased. As the hand lever 90 is moved from the high speed position to the low speed position in the general direction of arrow 52, the velocity of the crop sprayer 10 in the forward direction is decreased.

The intersection of the reverse segment 110 and the intermediate segment 108 defines a reverse transition corner 118. It should be appreciated that to position the hand lever 90 in the intermediate segment 108, the hand lever 90 must be moved to a position that places the carriage frame 68 in the low speed position. It should further be appreciated that to position the hand lever 90 in the reverse transition corner 118, the hand lever 90 is moved to the reverse position which actuates the reverse switch 86 so as to actuate the reverse clutch 36.

From the reverse transition corner 118, the hand lever 90 may be moved in the general direction of arrow 54 so as to increase the rotational speed of the crankshaft 25 of the engine 22. The travel of the hand lever 90 is restricted from moving in the general direction of arrow 54 by contact with a reverse terminal end 120 of the reverse segment 110. When the hand lever 90 contacts the reverse terminal end 120, the carriage frame 68 is positioned in a high speed position. Placing the carriage frame 68 in the high speed position causes the engine 22 to rotate the crankshaft 25 at the high speed.

It should be appreciated that when the hand lever 90 is positioned in the reverse segment 110, the reverse clutch 36 is actuated which enables the engine 22 to propel the crop sprayer 10 in the reverse direction. As the hand lever 90 is moved from the low speed position to the high speed position in the general direction of arrow 54, the velocity of the crop sprayer in the reverse direction is increased. As the hand lever 90 is moved from the high speed position to the low speed position in the general direction of arrow 52, the velocity of the crop sprayer 10 in the reverse direction is decreased.

When the hand lever 90 is positioned in the neutral position, i.e. the hand lever 90 is positioned in the detent notch 74 of the carriage frame 68, the hand lever 90 is operable to rotate the carriage frame 68 in a limited range of motion in the general direction of arrows 52 and 54. In particular, contact with an intermediate terminal end 122 limits rotation of the hand lever 90 in the general direction of arrow 54 whereas contact with the adjustable bolt 116 limits rotation of the carriage frame 68 in the general direction of arrow 52. When the hand lever 90 contacts the intermediate terminal end 122, the carriage frame 68 is positioned in an intermediate speed position which causes the engine 22 to rotate the crankshaft 25 at an intermediate speed. The intermediate speed is greater than the low speed and less than the high speed.

The limited range of motion of the carriage frame 68 in the neutral position allows the operator to increase the rotational speed of the crankshaft 25 without causing the crop sprayer to move in the general direction of arrows 17 or 19. Increasing the rotational speed of the crankshaft 25 provides additional engine power for accessory systems that are used when the crop sprayer 10 is stationary.

A significant advantage of the present invention is that positioning the hand lever 90 into and out of the forward transition corner 112 corresponds with actuating and deactuating the forward clutch 34, respectively, whereas positioning the hand lever 90 into and out of the reverse transition corner 118 corresponds with actuating and deactuating the reverse clutch 36, respectively. The forward transition corner 112 and the reverse transition corner 118 provide the operator with tactile feedback. In particular, moving the hand lever 90 into the forward transition corner 112 or the reverse transition corner 118, communicates status of the throttle 32, forward clutch 34, and reverse clutch 36 to the operator.

Additionally, the bias force of the spring 94 holds the hand lever 90 in the detent notch 74 which provides additional tactile feedback when the hand lever 90 is positioned in the neutral position. This tactile feedback allows the operator to control the throttle 32, forward clutch 34, and reverse clutch 36 without looking at the control console 42. Moreover, this tactile feedback is visually reinforced by graphics printed on the upper plate 103 of the control console 104. These graphics allow an operator who is unfamiliar with the operation of the hand lever 90 to quickly associate the tactile feedback associated with the hand lever 90 with a given mode of operation associated with the graphics.

In operation, the chemical tank 14 of the crop sprayer 10 is filled with chemicals. Depending on the spraying operation, the chemicals may be herbicides, insecticides, or fertilizers. Thereafter, the crop sprayer 10 is driven to a field to perform the spraying operation.

With the hand lever 90 positioned in the neutral position, the operator selects the gear ratio with the transmission 26 by manipulating the gear selector assembly 29. Typically, with a four speed transmission 26, the third gear will provide the range of speeds adequate to perform a spraying operation in the field.

Using a single hand, the operator is now able to manipulate a number of controls required for a spraying operation. The boom arm 15 can be extended to the position shown in FIG. 1 using the controls 91 mounted on the hand lever 90. The flow rate of chemicals through the nozzles on the boom arm 15 can also adjusted using the controls 91. After positioning the boom arm 15 and adjusting the chemical flow rate, the operator can control movement of the crop sprayer 10 by manipulating the hand lever 90.

To propel the crop sprayer 10 in the forward direction as indicated by arrow 17 in FIG. 1, the operator moves the hand lever 90 from the neutral position, where the hand lever 90 is positioned in the detent notch 74, in the general direction of arrow 99 to the forward transition corner 112. As a safety feature, the hand lever 90 cannot be moved directly in the direction of arrow 99 and must first be rotated in the general direction of arrow 52 against the bias force of the spring 94 which holds the hand lever 90 in the neutral position. As the operator positions the hand lever 90 in the forward transition corner 112, the forward switch 82 is actuated which sends an "on" signal via the signal line 84 to the forward clutch 34 which actuates the forward clutch 34.

The operator can verify actuation of the forward clutch 34 by the position of the hand lever 90 in the forward transition corner 112 either through tactile feedback or by visually confirming the position of the hand lever 90 in the U-shaped console aperture 104. Actuating the forward clutch 34 couples the crankshaft 25 to the drive shaft 28 allowing the engine 22 to propel the crop sprayer 10 in the forward direction as indicated by arrow 17 in FIG. 1.

To increase the velocity of the crop sprayer 10 in the forward direction, the operator rotates the hand lever 90 in the general direction of arrow 54 in the forward segment 106 which controls the throttle 32 to increase the rotational speed of the crankshaft 25 of the engine 22. To decrease the velocity of the crop sprayer 10 in the general direction of arrow 17, the operator rotates the hand lever 90 in the general direction of arrow 52 in the forward segment 106 which controls the throttle 32 to decrease the rotational speed of the crankshaft 25 of the engine 22.

Similarly, to move the crop sprayer in the reverse direction as indicated by arrow 19 of FIG. 1, the operator moves the hand lever 90 from the neutral position, where the hand lever 90 is positioned in the detent notch 74, in the general direction of arrow 100 to the reverse transition corner 118. As a safety feature, the hand lever 90 cannot be moved directly in the direction of arrow 100 and must first be rotated in the general direction of arrow 52 against the bias force of the spring 94 which holds the hand lever 90 in the neutral position. As the operator positions the hand lever 90 in the reverse transition corner 118, the reverse switch 86 is actuated which sends an "on" signal via the signal line 88 to the reverse clutch which actuates the reverse clutch 36.

The operator can verify actuation of the reverse clutch 36 by the position of the hand lever 90 in the reverse transition corner 118 either through tactile feedback or by visually confirming the position of the hand lever 90 in the U-shaped console aperture 104. Actuating the reverse clutch 36 couples the crankshaft 25 to the drive shaft 28 allowing the engine 22 to propel the crop sprayer 10 in the reverse direction as indicated by arrow 19 in FIG. 1.

To increase the velocity of the crop sprayer 10 in the reverse direction, the operator rotates the hand lever 90 in the general direction of arrow 54 in the reverse segment 110 which controls the throttle 32 to increase the rotational speed of the crankshaft 25 of the engine 22. To decrease the velocity of the crop sprayer 10 in the general direction of arrow 19, the operator rotates the hand lever 90 in the general direction of arrow 52 in the reverse segment 110 which controls the throttle 32 to decrease the rotational speed of the crankshaft 25 of the engine 22.

Additionally, when the hand lever 90 is positioned in the neutral position, neither the forward clutch 34 nor the reverse clutch 36 is actuated. However, when the hand lever 90 is positioned in the neutral position, the hand lever 90 can rotate the carriage frame 68 in the general direction of arrow 54 until the hand lever contacts the intermediate terminal end 122 so as to increase the rotational speed of the crankshaft 25 of the engine 22. While increasing the rotational speed of the crankshaft 25 does not move the crop sprayer 10 in the forward direction or the reverse direction, it does allow increased engine power to be applied to auxiliary systems such as the hydraulics system used to manipulate the boom arm 15.

It should be appreciated that as the crop sprayer is maneuvered around the field the operator can manipulate the boom arm 15 and adjust the flow rate of chemicals through the nozzles without removing his hand from the hand lever 90. In particular, the operator can control (i) the boom arm 15, (ii) the flow rate of chemicals through the nozzles, (iii) the throttle 32, (iv) the forward clutch 34, and (v) the reverse clutch 36 with a single hand positioned on the hand lever 90.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

What is claimed is:

1. A speed control assembly, comprising:

a throttle which controls rotational speed of a crankshaft of an engine;

a hand lever which is operatively coupled to said throttle;

a forward switch operatively coupled to a forward clutch, said forward switch (i) causes said forward clutch to couple said crankshaft to a drive shaft so that said crankshaft rotates said drive shaft in a forward rotational direction when said forward switch is actuated, and (ii) causes said forward clutch to decouple said crankshaft from said drive shaft so that said crankshaft does not rotate said drive shaft in said forward rotational direction when said forward switch is deactuated;

a reverse switch operatively coupled to a reverse clutch, said reverse switch (i) causes said reverse clutch to couple said crankshaft to said drive shaft so that said crankshaft rotates said drive shaft in a reverse rotational direction when said reverse switch is actuated, and (ii) causes said reverse clutch to decouple said crankshaft from said drive shaft so that said crankshaft does not rotate said drive shaft in said reverse rotational direction when said reverse switch is deactuated;

a speed control console having a lever aperture defined therein through which said hand lever extends, wherein (i) said lever aperture includes a forward segment, a reverse segment, and an intermediate segment, (ii) said forward segment and said intermediate segment define a forward transition corner, (iii) said reverse segment and said intermediate segment define a reverse transition corner, (iv) said forward segment defines a terminal forward end, (v) said reverse segment defines a terminal reverse end, (vi) said forward switch is actuated when said hand lever is positioned within said forward transition corner,(vii) said reverse switch is actuated when said hand lever is positioned within said reverse transition corner, (viii) movement of said hand lever from said forward transition corner to said terminal forward end causes said throttle to increase the rotational speed of said crankshaft of said engine, and (ix) movement of said hand lever from said reverse transition corner to said terminal reverse end causes said throttle to increase the rotational speed of said crankshaft of said engine; and a carriage which is operatively coupled to said throttle, wherein (i) said crankshaft rotates at a low speed when said carriage is positioned at a low speed position, (ii) said crankshaft rotates at a high speed when said carriage is positioned at a high speed position, (iii) said carriage supports each of said forward switch, said reverse switch, and said hand lever, (iv) said carriage remains positioned in said low speed position when said hand lever is moved between said forward transition corner and said reverse transition corner, (v) said carriage moves from said low speed position to said high speed position when said hand lever is moved from said forward transition corner to said forward terminal end, and (vi) said carriage moves from said low speed position to said high speed position when said hand lever is moved from said reverse transition corner to said reverse terminal end.

2. The assembly of claim 1, wherein:

said carriage has a detent notch defined therein, said hand lever is positioned within said intermediate segment so as to cause both said forward switch and said reverse switch to be deactuated when said hand lever is positioned in said detent notch, and movement of said hand lever toward either said forward transition corner or said reverse transition corner is inhibited when said hand lever is positioned in said detent notch.

3. The assembly of claim 2, further comprising a spring which is supported by said carriage, wherein:

said spring biases said hand lever into said detent notch.

4. The assembly of claim 1, wherein:

said crankshaft rotates at an intermediate speed when said carriage is positioned at an intermediate speed position, movement of said carriage from said low speed position to said intermediate speed position causes said throttle to increase rotational speed of said crankshaft, and said lever aperture is configured to allow said hand lever to be moved within said intermediate segment so as to cause said carriage to advance from said low speed position to said intermediate speed position while both said forward switch and said reverse switch are deactuated.

5. The assembly of claim 2, said crankshaft rotates at an intermediate speed when said carriage is positioned at an intermediate speed position, movement of said carriage from said low speed position to said intermediate speed position causes said throttle to increase rotational speed of said crankshaft, and said lever aperture is configured to allow said hand lever to be moved so as to cause said carriage to advance from said low speed position to said intermediate speed position while said hand lever remains positioned within said detent notch.

6. The assembly of claim 1, further comprising a stop supported by said control console, wherein:

said stop limits movement of said carriage, said carriage is located at said low speed position when said carriage contacts said stop, and said stop is adjustable, whereby rotational speed of said crankshaft when said carriage is located at said low speed position may be adjusted.

7. A speed control assembly, comprising:

a throttle which controls rotational speed of a crankshaft of an engine;

a carriage which is operatively coupled to said throttle, wherein (i) said engine rotates said crankshaft at a low speed when said carriage is positioned at a low speed position, and (ii) said engine rotates said crankshaft at a high speed when said carriage is positioned at a high speed position;

a forward switch supported by said carriage, said forward switch being operatively coupled to a forward clutch;

a reverse switch supported by said carriage, said reverse switch being operatively coupled to a reverse clutch; and a hand lever which is supported by said carriage, wherein (i) said hand lever is movable relative to said carriage so as to be positionable in any one of the following positions: a forward position, a neutral position, and a reverse position, (ii) said forward switch is actuated and said reverse switch is deactuated when hand lever is positioned in said forward position, (iii) said forward switch is deactuated and said reverse switch is actuated when said hand lever is positioned in said reverse position, and (iv) both said forward switch and said reverse switch are deactuated when hand lever is positioned in said neutral position, wherein said forward switch (i) causes said forward clutch to couple said engine to a drive shaft so that said crankshaft rotates said drive shaft in a forward rotational direction when said forward switch is actuated, and (ii) causes said forward clutch to decouple said crankshaft from said drive shaft so that said crankshaft does not rotate said drive shaft in said forward rotational direction when said forward switch is deactuated, and wherein said reverse switch (i) causes said reverse clutch to couple said crankshaft to said drive shaft so that said crankshaft rotates said drive shaft in a reverse rotational direction when said reverse switch is actuated, and (ii) causes said reverse clutch to decouple said crankshaft from said drive shaft so that said crankshaft does not rotate said drive shaft in said reverse rotational direction when said reverse switch is deactuated.

8. The assembly of claim 7, further comprising a speed control console having a lever aperture defined therein through which said hand lever extends, wherein:

said lever aperture includes a forward segment, a reverse segment, and an intermediate segment, said forward segment, said reverse segment, and said intermediate segment collectively defines a substantially U-shaped aperture, and said hand lever extends through said substantially U-shaped aperture.

9. The assembly of claim 7, wherein:

said forward switch remains continuously actuated while said hand lever is moved within said forward segment and said hand lever is positioned in said forward position, and said reverse switch remains continuously actuated while said hand lever is moved within said reverse segment and said hand lever is positioned in said reverse position.

10. The assembly of claim 7, wherein:

said carriage remains positioned in said low speed position when said hand lever is moved between said forward transition corner and said reverse transition corner, said carriage is moveable from said low speed position to said high speed position when said hand lever is positioned in said forward position, and said carriage is moveable from said low speed position to said high speed position when said hand lever is positioned in said reverse position.

11. The assembly of claim 8, wherein:

said carriage has a detent notch defined therein, said hand lever is positioned in said neutral position when said hand lever is positioned in said detent notch, and movement of said hand lever toward either said forward transition corner or said forward position or said reverse position is inhibited when said hand lever is positioned in said detent notch.

12. The assembly of claim 11, further comprising a spring which is supported by said carriage, wherein:

said spring biases said hand lever into said detent notch.

13. The assembly of claim 10, wherein:

said crankshaft rotates at an intermediate speed when said carriage is positioned at an intermediate speed position, movement of said carriage from said low speed position to said intermediate speed position causes said throttle to increase rotational speed of said crankshaft, and said lever aperture is configured to allow said hand lever to be moved within said intermediate segment so as to cause said carriage to advance from said low speed position to said intermediate speed position while said hand lever is positioned in the neutral position.

14. The assembly of claim 11, said crankshaft rotates at an intermediate speed when said carriage is positioned at an intermediate speed position, movement of said carriage from said low speed position to said intermediate speed position causes said throttle to increase rotational speed of said crankshaft, and said lever aperture is configured to allow said hand lever to be moved so as to cause said carriage to advance from said low speed position to said intermediate speed position while said hand lever remains positioned within said detent notch.

15. The assembly of claim 10, further comprising a stop supported by said control console, wherein:

said stop limits movement of said carriage, said carriage is located at said low speed position when said carriage contacts said stop, and said stop is adjustable, whereby rotational speed of said crankshaft when said carriage is located at said low speed position may be adjusted.

16. A method of controlling rotational speed and direction of a drive shaft with a speed control assembly having (1) a throttle which controls speed of a crankshaft of an engine, (2) a carriage which is operatively coupled to the throttle, wherein (a) the engine rotates a crankshaft at a low speed when the carriage is positioned at a low speed position, and (b) the engine rotates the crankshaft at a high speed when the carriage is positioned at a high speed position, (3) a forward switch operatively coupled to a forward clutch, the forward switch (a) causes the forward clutch to couple the crankshaft to the drive shaft so that the crankshaft rotates the drive shaft in a forward rotational direction when the forward switch is actuated, and (b) causes the forward clutch to decouple the crankshaft from the drive shaft so that the crankshaft does not rotate the drive shaft in the forward rotational direction when the forward switch is deactuated, (4) a reverse switch operatively coupled to a reverse clutch, the reverse switch (a) causes the reverse clutch to couple the crankshaft to the drive shaft so that the crankshaft rotates the drive shaft in a reverse rotational direction when the reverse switch is actuated, and (b) causes the reverse clutch to decouple the crankshaft from the drive shaft so that the crankshaft does not rotate the drive shaft in the reverse rotational direction when the reverse switch is deactuated, and (5) a hand lever which is supported by the carriage, wherein (a) the hand lever is movable relative to the carriage so as to be positionable in any one of the following positions: a forward position, a neutral position, and a reverse position, (b) the forward switch is actuated and the reverse switch is deactuated when the hand lever is positioned in the forward position, (c) the forward switch is deactuated and the reverse switch is actuated when the hand lever is positioned in the reverse position, and (d) both the forward switch and the reverse switch are deactuated when hand lever is positioned in the neutral position, comprising the steps of:

moving the carriage from the low speed position to the high speed position when the hand lever is positioned in the forward position whereby speed of the drive shaft in the forward rotational direction is increased; and moving the carriage from the low speed position to the high speed position when the hand lever is positioned in the reverse position whereby speed of the drive shaft in the reverse rotational direction is increased.

17. The method of claim 16, further comprising the steps of:

continuously actuating the forward switch while the hand lever is positioned in the forward position and the carriage is moved from the low speed position to the high speed position, and continuously actuating the reverse switch while the hand lever is positioned in the reverse position and the carriage is moved from the low speed position to the high speed position.

18. The method of claim 16, wherein:

(i) the carriage has a detent notch defined therein, and (ii) the hand lever is positioned in the neutral position when the hand lever is positioned in the detent notch, further including the step of:

inhibiting movement of the hand lever toward either the forward position or the reverse position with the detent notch.

19. The method of claim 18, wherein the speed control assembly further comprises a spring which is supported by the carriage, further including the step of:

biasing the hand lever into the detent notch with the spring.

20. The method of claim 16, wherein:

(i) the crankshaft rotates at an intermediate speed when the carriage is positioned at an intermediate speed position, and (ii) movement of the carriage from the low speed position to the intermediate speed position causes the throttle to increase rotational speed of the crankshaft, further comprising the step of:

moving the hand lever so as to cause the carriage to advance from the low speed position to the intermediate speed position while the hand lever is positioned in the neutral position.

21. The method of claim 16, wherein:

(i) the speed control assembly further comprises a stop positioned to limit movement of the carriage, and (ii) the carriage is located at the low speed position when the carriage contacts the stop, further comprising the step of:

adjusting the position of the stop to alter rotational speed of the crankshaft when the carriage is located at the low speed position.

* * * * *